US010945376B2

(12) United States Patent
Estock et al.

(10) Patent No.: US 10,945,376 B2
(45) Date of Patent: Mar. 16, 2021

(54) ROTOR CAGE WITH FLAT WALLS FOR AN AGRICULTURAL VEHICLE

(71) Applicant: CNH Industrial America LLC, New Holland, PA (US)

(72) Inventors: Nicholas Estock, Cincinnati, OH (US); Clinton T. Baltz, Lincoln University, PA (US); Trey Davenport, III, Gainesville, GA (US); Wayne T. Flickinger, Oxford, PA (US); Benjamin D. Kemmerer, Hamburg, PA (US); Joshua A. Lesher, Bernville, PA (US)

(73) Assignee: CNH Industrial America LLC, New Holland, PA (US)

( * ) Notice: Subject to any disclaimer, the term of this patent is extended or adjusted under 35 U.S.C. 154(b) by 171 days.

(21) Appl. No.: 16/183,693

(22) Filed: Nov. 7, 2018

(65) Prior Publication Data

US 2019/0133042 A1    May 9, 2019

Related U.S. Application Data

(60) Provisional application No. 62/582,646, filed on Nov. 7, 2017.

(51) Int. Cl.
*A01F 7/06* (2006.01)
*A01F 12/26* (2006.01)
*A01F 12/22* (2006.01)
*A01F 12/24* (2006.01)

(52) U.S. Cl.
CPC .............. *A01F 7/067* (2013.01); *A01F 12/22* (2013.01); *A01F 12/24* (2013.01); *A01F 12/26* (2013.01)

(58) Field of Classification Search
CPC .......... A01F 12/22; A01F 12/24; A01F 12/26; A01F 7/067; A01F 12/181; A01F 12/28
See application file for complete search history.

(56) References Cited

U.S. PATENT DOCUMENTS

| | | | |
|---|---|---|---|
| 2,305,964 A | 12/1942 | Harrison et al. | |
| 4,244,380 A | 1/1981 | DePauw et al. | |
| 4,258,726 A * | 3/1981 | Glaser | A01F 12/24 460/109 |
| 4,541,441 A * | 9/1985 | Ichikawa | A01F 12/442 460/66 |

(Continued)

FOREIGN PATENT DOCUMENTS

| CN | 2671322 Y | 1/2005 |
|---|---|---|
| CN | 201150193 Y | 11/2008 |

(Continued)

OTHER PUBLICATIONS

Extended European Search Report for EP Application No. 18203218.5 dated Apr. 1, 2019 (six pages).

*Primary Examiner* — Abigail A Risic
(74) *Attorney, Agent, or Firm* — Peter Zacharias; Patrick Sheldrake

(57) ABSTRACT

A threshing and separating system for an agricultural harvester includes: a rotor; a rotor cage at least partially enclosing the rotor, the rotor cage including a first flat wall, a second flat wall connected to and angled with respect to the first flat wall, and a curved wall connected to the second flat wall; and at least one vane connected to the first flat wall or the second flat wall.

13 Claims, 2 Drawing Sheets

(56) References Cited

U.S. PATENT DOCUMENTS

| | | | |
|---|---|---|---|
| 8,118,649 B1* | 2/2012 | Murray | A01F 12/28 460/5 |
| 8,540,559 B1 | 9/2013 | Flickinger et al. | |
| 9,282,696 B2 | 3/2016 | Regier | |
| 2009/0111547 A1* | 4/2009 | Pope | A01F 7/067 460/80 |
| 2017/0231155 A1* | 8/2017 | Duquesne | A01F 7/062 460/4 |
| 2017/0325407 A1* | 11/2017 | Kemmerer | A01F 12/181 |
| 2018/0153104 A1* | 6/2018 | Matousek | A01F 12/181 |
| 2018/0160627 A1* | 6/2018 | Kemmerer | A01F 7/062 |

FOREIGN PATENT DOCUMENTS

| | | |
|---|---|---|
| DE | 102013019680 A1 | 3/2015 |
| JP | 2009095259 A | 5/2009 |
| JP | 5905307 B2 | 4/2016 |
| WO | 2014/117450 A1 | 8/2014 |
| WO | 2015/075516 A1 | 5/2015 |

\* cited by examiner

ROTOR CAGE WITH FLAT WALLS FOR AN AGRICULTURAL VEHICLE

FIELD OF THE INVENTION

The present invention pertains to a threshing and separating system for an agricultural vehicle and, more specifically, to a rotor cage of the threshing and separating system.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement.

Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more threshing rotors which can extend axially (front to rear) or transversely within the body of the combine, and which are partially or fully surrounded by a perforated concave. Again, the one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

To move crop material through the threshing chamber, a rotor cage can be equipped with one or more vanes. The rotor vanes direct crop material flow through the threshing chamber as the rotor rotates so that crop material can flow across the length of the threshing chamber rather than simply tumbling within the threshing chamber. To control the speed at which crop material travels through the threshing chamber, the rotor vanes can have an adjustable pitch which allows a user to change how quickly crop material travels through the threshing chamber. An example of a threshing system with adjustable pitch vanes is described in U.S. Patent Application Publication No. 2011/0320087 to Farley et al. While adjustable pitch vanes have helped increase the throughput of the combine by controlling the speed of crop material traveling through the threshing chamber, especially when harvesting under various crop conditions, power consumption and crop loss remain as ever-present concerns in combine harvesters.

Many rotor cage designs have been produced with substantially cylindrical rotor cages having a constant diameter across a rotor axis of the rotor. Some rotor cages have been described which incorporate both curved and flat portions; for example, U.S. Patent Application Publication No. 2009/0111547 to Pope et al. describes a rotor cage with a curved wall connected to two flat walls. The curved wall described by Pope et al. has a fixed vane affixed thereto and one of the flat walls has an adjustable vane connected thereto. Relative to a rotational direction of the rotor, the adjustable vane of Pope et al. on the flat wall follows the fixed vane on the curved wall. It has been found that the configuration described by Pope et al. consumes power relatively inefficiently and does not provide desired material transport through the rotor cage.

What is needed in the art is a threshing and separating system which can overcome some of the previously described shortcomings of known threshing and separating systems.

SUMMARY OF THE INVENTION

In one exemplary embodiment formed in accordance with the present invention, there is provided a rotor cage with one or more flat walls connected to a curved wall and a fixed vane affixed to the flat wall.

In another exemplary embodiment formed in accordance with the present invention, there is provided a threshing and separating system for an agricultural harvester including: a rotor; a rotor cage at least partially enclosing the rotor, the rotor cage including a first flat wall, a second flat wall connected to and angled with respect to the first flat wall, and a curved wall connected to the second flat wall; and at least one vane connected to the first flat wall or the second flat wall.

In yet another exemplary embodiment formed in accordance with the present invention, there is provided a threshing and separating system for an agricultural harvester including: a rotor configured to rotate in a rotational direction about a rotor axis; a rotor cage at least partially enclosing the rotor, the rotor cage including at least one flat wall connected to a curved wall; a fixed vane affixed to the at least one flat wall; and an adjustable vane movably connected to the at least one flat wall and substantially aligned circumferentially with the fixed vane about the rotor axis, the adjustable vane following the fixed vane in the rotational direction.

One possible advantage of exemplary embodiments of the threshing and separating system is the adjustment of crop material flow across the flat wall(s) earlier in the rotational direction of the rotor can increase flow efficiency.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
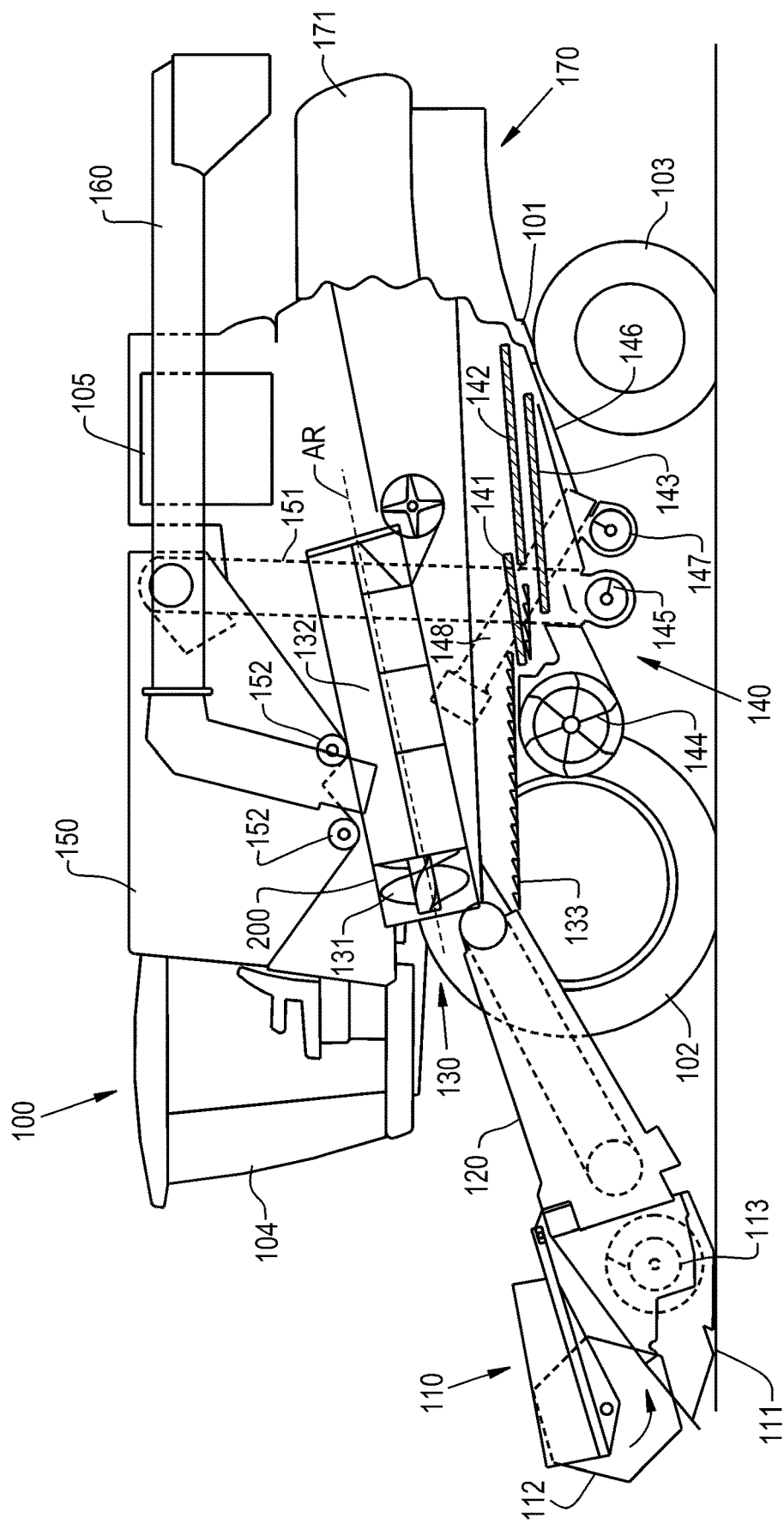
FIG. 1 illustrates an exemplary embodiment of an agricultural vehicle, the agricultural vehicle comprising a threshing and separating system, in accordance with an exemplary embodiment of the present invention.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, it is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage 200 (shown in greater detail in FIGS. 2-3) and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
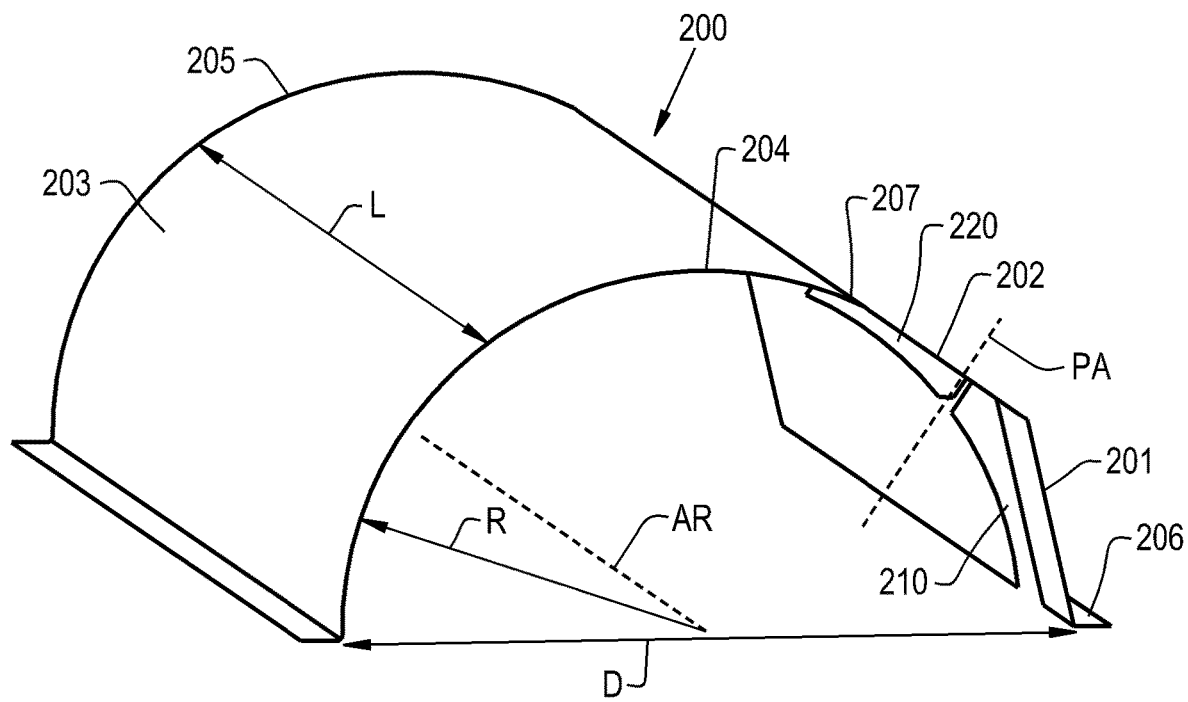
FIG. 2 illustrates a perspective view of a rotor cage and vanes of the threshing and separating system of FIG. 1, in accordance with an exemplary embodiment of the present invention.
Figure 3:
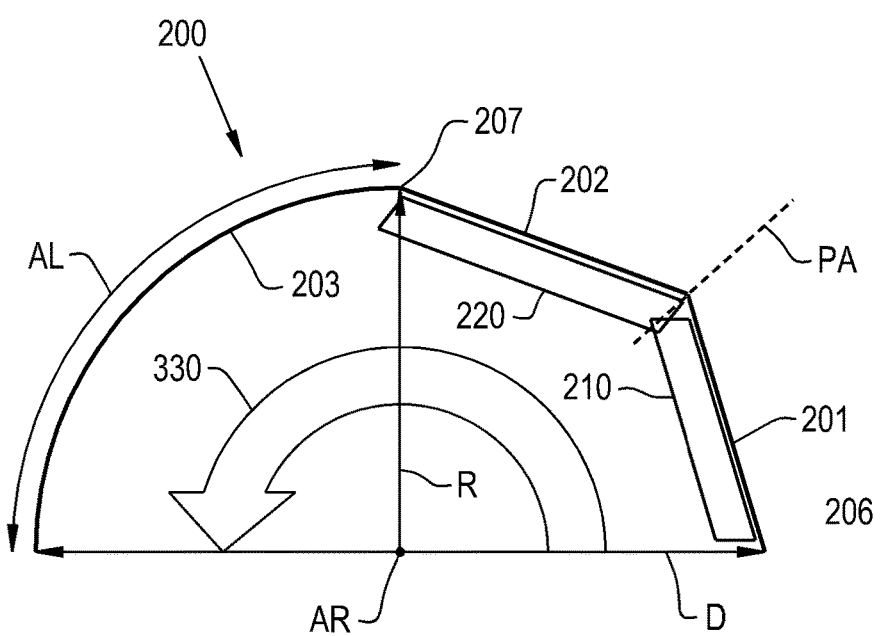
FIG. 3 illustrates a front view of the rotor cage and vanes of the threshing and separating system of FIGS. 1-2, in accordance with an exemplary embodiment of the present invention.

Referring specifically now to FIGS. 2-3, an exemplary embodiment of the rotor cage 200 formed in accordance with the present invention is shown which includes a first flat wall 201, a second flat wall 202 connected to and angled with respect to the first flat wall 201, and a curved wall 203 connected to the second flat wall 202. While the exemplary embodiment of the rotor cage 200 is shown as including a first flat wall 201 and a second flat wall 202, in some exemplary embodiments the rotor cage 200 may only include at least one flat wall, i.e., one flat wall or more than two flat walls. As can be seen, the rotor cage 200 can have a front 204 and a rear 205 defining a length L of the rotor cage 200 therebetween. In some exemplary embodiments, the first flat wall 201 and the second flat wall 202 can define planar surfaces which extend from the front 204 to the rear 205 of the rotor cage 200, i.e., across the entire length L of the rotor cage 200. It should be appreciated that the flat walls 201, 202 of the rotor cage 200, alternatively, may only extend partly from the front 204 to the rear 205 of the rotor cage 200.

As the rotor cage 200 at least partially encloses the rotor 131 defining a rotor axis AR, the shape of the rotor cage 200 can be corresponded to the rotor axis AR of the rotor 131. In one exemplary embodiment, a diameter D of the rotor cage 200 is defined between a first wall end 206 of the first flat wall 201 and the curved wall 203 so the first wall end 206 of the first flat wall 201 is opposite the curved wall 203. In some exemplary embodiments, the curved wall 203 can define a radius R relative to the rotor axis AR which is adjacent and tangent to a second wall end 207 of the second flat wall 202, with the curved wall 203 meeting the second wall end 207 at or adjacent to a top of the rotor cage 200. Further, as can be seen, the curved wall 203 can define an arc relative to the rotor axis AR which has an arc length AL of at least 90 degrees. It should be appreciated that the arc length AL of the curved wall 203 can also be less than 90 degrees, if desired.

To control crop material through the rotor cage 200, the threshing and separating system 130 may include one or more vane(s) fixedly or moveably connected to the first flat wall 201 and/or the second flat wall 202. For instance, a fixed vane 210 may be affixed to the first flat wall 201 or the second flat wall 202. As shown in FIGS. 2-3, the fixed vane 210 is affixed to the first flat wall 201, the significance of which will be described further herein. As used herein, the vane 210 is "fixed" to the flat wall in the sense that the vane 210 will generally resist pivoting or other movement relative to the flat wall; in some exemplary embodiments, the fixed vane 210 may be bolted to the rotor cage 200. In some exemplary embodiments, an adjustable vane 220 is movably connected to the rotor cage 200; in the exemplary embodiment shown herein, the adjustable vane 220 is movably connected to the second flat wall 202. The adjustable vane 220 may, for example, be pivotably connected to the second flat wall 202 at or adjacent to the second wall end 207 so the adjustable vane 220 may pivot in a pivot slot (not shown) about a pivot axis PA in order to adjust crop material flow through the rotor cage 200. The structure and controlled movement of adjustable vanes are known, for example, from U.S. Patent Application Publication No. 2011/0320087 to Farley et al., which is incorporated herein by reference, so further description of the construction and movement of the adjustable vane 220 is omitted. It should be appreciated that, due to the vanes 210, 220 connecting to flat walls 201, 202, the portions of the vanes 210, 220 conforming to the shape of the rotor cage 200 can be flat, which is a relatively easy construction compared to vanes which must have a curved portion to conform to the shape of a curved wall of the rotor cage 200. Further, in some exemplary embodiments, the profile of the vanes 210, 220 can be curved, as shown, to have a constant clearance relative to the rotor 131.

As can be seen in FIGS. 2-3, the fixed vane 210 and the adjustable vane 220 may be substantially aligned circumferentially about the rotor axis AR such that an imaginary circumference extending about the rotor axis AR will pass through both the fixed vane 210 and the adjustable vane 220. Referring specifically now to FIG. 3, it can be seen that the rotor 131 can be configured to rotate about the rotor axis AR in a rotational direction, indicated by the arrow R. Due to the rotation of the rotor 131, crop material traveling through the rotor cage 200 will also tend to move in the rotational direction 330, coming into contact with and being directed by the vanes 210 and 220 during rotation. By substantially aligning the vanes 210 and 220 circumferentially or helically about the rotor axis AR, crop material moving through the rotor cage 200 can be directed across the vanes 210 and 220 during rotation of the rotor 131 to travel down the length L of the rotor cage 200. In some exemplary embodiments, the first flat wall 201, and the affixed fixed vane 210, can be located before the second flat wall 202, and the movably connected adjustable vane 220, in the rotational direction 330, i.e., the second flat wall 202 and adjustable vane 220 can follow the first flat wall 201 and fixed vane 210 in the rotational direction 330 of the rotor 131. The curved wall 203, then, can follow the second flat wall 202 in the rotational direction 330 of the rotor 131, so crop material traveling through the rotor cage 200 will travel across the first flat wall 201 and fixed vane 210 to the second flat wall 202 and adjustable vane 220 before traveling across the curved wall 203. It should be appreciated from the foregoing that the flat walls 201, 202 and curved wall 203 together can form a continuous surface about the rotor axis AR which vanes, such as vanes 210 and 220, can attach to and/or crop material can flow across.

By analyzing crop material flow through the rotor cage 200, it has been found that vanes located on the right side (when viewed from the front) of the rotor cage 200, i.e., adjacent the first flat wall 201, have a less pronounced effect on crop material flow through the rotor cage 200. As is known, crop flow through the threshing and separating system 130 "straightens up" when going over the concave 132. By placing the fixed vane 210 on the first flat wall 201, the fixed vane 210 can "condition" the crop material flow traveling in the rotational direction 330 before the crop material hits the adjustable vane 220, which may be adjusted to adjust crop material flow through the rotor cage 200. Since the adjustable vane 220 can follow the fixed vane 210, relative to the rotational direction 330 of the rotor 131, the adjustable vane 220 can have a more pronounced effect on the crop material flow, which may allow adjustment of the vane 220 by an operator to more efficiently redirect crop material flow than if, for example, the fixed vane 210 followed the adjustable vane 220 relative to the rotational direction 330 of the rotor 131. Changing the vane angle of an adjustable vane 220 following a fixed vane 210, therefore, can allow a user to adjust crop material flow through the rotor cage 200 responsively to different harvesting conditions, such as going from harvesting corn to harvesting soybeans, and vice versa, without needing to manually adjust the adjustable vane 220.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A threshing and separating system for an agricultural harvester, comprising:
   a rotor having a rotor axis;
   a rotor cage at least partially enclosing the rotor, the rotor cage including a first flat wall, a second flat wall connected to and angled with respect to the first flat wall, and a curved wall connected to the second flat wall;
   at least one vane connected to the first flat wall; and
   at least one vane connected to the second flat wall,
   wherein the at least one vane connected to the first flat wall and the at least one vane connected to the second flat wall are helically aligned relative to the rotor axis.

2. The threshing and separating system of claim 1, wherein the rotor cage defines a diameter between a first wall end of the first flat wall and the curved wall.

3. The threshing and separating system of claim 2, wherein the at least one vane connected to the first flat wall is an at least one fixed vane.

4. The threshing and separating system of claim 2, wherein the at least one vane connected to the first flat wall is fixed, and wherein the at least one vane connected to the second flat wall is adjustable.

5. The threshing and separating system of claim 4, wherein the curved wall defines a radius relative to the rotor axis which is adjacent to a second wall end of the second flat wall.

6. The threshing and separating system of claim 1, wherein the rotor is configured to rotate in a rotational direction, wherein the second flat wall follows the first flat wall in the rotational direction, and wherein the curved wall follows the second flat wall in the rotational direction.

7. The threshing and separating system of claim 1, wherein the rotor cage defines a length from a front of the rotor cage to a rear of the rotor cage, and wherein the first flat wall and the second flat wall extend from the front of the rotor cage to the rear of the rotor cage.

8. The threshing and separating system of claim 1, wherein the curved wall defines an arc with an arc length of at least 90 degrees relative to the rotor axis.

9. An agricultural harvester, comprising:
   a threshing and separating system comprising:
      a rotor configured to rotate in a rotational direction about a rotor axis;
      a rotor cage at least partially enclosing the rotor, the rotor cage including a first flat wall, a second flat wall connected to an angled with respect to the first flat wall, and a curved wall connected to the second flat wall;
      a fixed vane affixed to the first flat wall; and
      an adjustable vane movably connected to the second flat wall and substantially aligned circumferentially with the fixed vane about the rotor axis, the adjustable vane following the fixed vane in the rotational direction; and
   a cleaning system.

10. The agricultural harvester of claim 9, wherein the curved wall defines a radius relative to the rotor axis which is adjacent to a second wall end of the second flat wall.

11. The agricultural harvester of claim 9, wherein the curved wall follows the second flat wall in the rotational direction.

12. The agricultural harvester of claim 9, wherein the rotor cage defines a length from a front of the rotor cage to a rear of the rotor cage, and wherein the first flat wall and the second flat wall extend from the front of the rotor cage to the rear of the rotor cage.

13. The agricultural harvester of claim 9, wherein the curved wall defines an arc with an arc length of at least 90 degrees relative to the rotor axis.

* * * * *